United States Patent

[11] 3,619,228

[72] Inventors Earland G. Hallonquist
 Nanaimo, British Columbia;
 Manfred M. Honnige, Cedar, British Columbia, both of Canada
[21] Appl. No. 567,359
[22] Filed July 25, 1966
[45] Patented Nov. 9, 1971
[73] Assignee MacMillan Bloedel Limited
 Vancouver, British Columbia, Canada

[54] METHOD OF PATCHING WOOD PRODUCTS USING A PARTICULAR POLYESTER BLEND
 4 Claims, No Drawings

[52] U.S. Cl......... 117/2,
 260/9 R, 260/40 R, 260/75 T, 260/869
[51] Int. Cl......... B32b35/00,
 C08b 27/18, C08b 27/04
[50] Field of Search......... 260/9, 75
 H, 75 A, 75 T, 869, 40; 117/2

[56] References Cited
UNITED STATES PATENTS

| 2,354,572 | 7/1944 | Bradley | 260/9 |
|---|---|---|---|
| 2,393,525 | 1/1946 | Farrell | 260/9 |
| 2,461,900 | 2/1949 | Johnson | 260/9 |
| 2,671,070 | 3/1954 | Knapp | 260/75 H |
| 2,779,701 | 1/1957 | Robitschek et al | 260/75 H |
| 2,890,144 | 6/1959 | Robitschek et al | 260/75 H |
| 3,333,022 | 7/1967 | Reiners et al | 260/75 A |
| 2,888,359 | 5/1959 | Jorgensen et al | 117/2 |
| 3,098,053 | 7/1963 | Hallonquist | 117/2 |
| 3,455,869 | 7/1969 | Ernst et al | 260/40 |
| 3,457,094 | 7/1969 | Elmendorf et al | 117/2 |
| 3,462,514 | 8/1969 | Kurkowski et al | 260/40 |

Primary Examiner—William H. Short
Assistant Examiner—Edward Woodberry
Attorney—Fetherstonhaugh & Co.

ABSTRACT: An improved plywood patch is obtained by a method of patching plywood comprising the steps of preparing a blend of (A) 45 to 72 weight percent of a mixture containing (1) a polymerizable linear polyester resin comprising reactants of (a) a polyhydric alcohol, (b) an adduct of hexahalocyclopentadiene and an ethylenically unsaturated polycarboxylic compound and (c) a compound selected from the group consisting of maleic anhydride and fumaric acid and (2) an ethylenically unsaturated monomer, (B) 0–10 weight percent of a modifying monomer selected from the group consisting of styrene, vinyl toluene, vinylacetate and α-methyl styrene and (C) 28 to 45 weight percent of an inert material selected from the group consisting of clay, whiting, asbestos, shell flour and wood flour, mixing a catalyst with said blend, applying the catalyzed blend to defects in a plywood surface and curing the blend for at least 10 minutes at a temperature of about 200° to 235° F.

METHOD OF PATCHING WOOD PRODUCTS USING A PARTICULAR POLYESTER BLEND

This invention relates to a method of patching defects in wood, particularly plywood.

The use of plastic patching compositions has become widely accepted in the plywood industry, and particularly in the Douglas-fir plywood industry, replacing the use of wood shims and router patches for the repair of minor defects, such as splits, cracks, etc. up to three-sixteenths of an inch wide.

Patching compositions based on thermoplastic resins have been used extensively because of their low cost and ease of handling. (No pot life problem, rapid drying, ease of clean-up with solvents). Their use, however, has been restricted by their limited resistance to weathering which can eventually result in softening and rapid abrasion or erosion of the patch, and/or shrinkage of the patch which may then fall out.

To overcome the defects of the thermoplastic resins, patching compositions based on thermosetting resins have been developed. However, these too have had serious drawbacks (limited pot-life; tendency to be either too soft and tacky, or too hard and brittle; limited adhesion; tendency to shrink during cure) which, together with their higher cost have limited their general use by the industry.

The ideal patching compound for the plywood industry may be considered to have the following requirements:
1. Permanent adhesion under severe conditions of exposure.
2. A reasonably long pot-life in order to reduce waste and avoid the cost of preparing frequent small batches.
3. A rapid cure, without bubbling, allowing sanding within a few minutes of application.
4. A high degree of heat stability, so that the patch will sand satisfactorily, even when warm.
5. A good color match with the plywood, a high degree of color stability, and inertness to wood, or its extractives so that there is no staining.
6. A narrow range of hardness—not so hard that it cannot be nailed or worked with conventional tools, and not so soft that it will readily mar or crumble.

At the present time there is no patching compound available that will meet all of the above requirements. Phenolic resin based compositions, while meeting most of the requirements for a thermosetting patch, lack color stability. The patch changes color on aging and soon stands out from the wood around it.

Epoxy resin based compositions, while having excellent adhesion, have a very short pot-life and a tendency to retain a marked degree of thermoplasticity for a considerable time after hardening, so that they cannot be readily sanded in a line operation.

Polyester based patching compositions most nearly meet the requirements of a satisfactory patching compound, possessing good color stability and reasonable pot-life. However, available polyester compositions have had a tendency to shrink during cure and/or to exhibit residual surface tack which makes sanding difficult. The problem of surface tack is improved, but not entirely eliminated, by use of so-called air-curing resins which contain a small amount of wax. The wax in air-curing resins serves to exclude air from the surface of the patch, which would otherwise inhibit the cure of the resin at the surface. The presence of wax in the air-curing resins may be expected to present problems of adhesion over and round the patch, if the patched panel is to be subsequently painted or overlaid.

Residual tack and the sanding properties may be improved by use of harder resins, but when this is done a hard brittle patch results which resists nailing and/or working with tools.

It has now been found that the above problems are overcome by patching plywood with a patching composition containing a polyester resin comprising (1) a polymerizable linear polyester of ingredients comprising (a) a polyhydric alcohol, (b) an adduct of hexahalocyclopentadiene and a polycarboxylic acid compound containing carbon to carbon unsaturation, wherein the halogen is chlorine, bromine, fluorine or mixtures thereof, and (c) a polycarboxylic compound containing aliphatic carbon to carbon unsaturation and (2) a polymerizable compound containing carbon to carbon unsaturation and polymerizing the patching composition in position on the wood. The preferred polyester is one in which the polyhydric alcohol (a) is a glycol such as ethylene glycol, propylene glycol, diethylene glycol, triethylene glycol and mixtures thereof, the adduct (b) is a 1,4,5,6,7,7-hexachlorobicyclo-(2,2,1)-5-heptene-2,3-dicarboxylic anhydride from the Diels Alder reaction of hexachlorocyclopentadiene with an ethylenically unsaturated polycarboxylic compound such as maleic anhydride and the polycarboxylic compound containing aliphatic carbon to carbon unsaturation (c) is an ethylenically unsaturated dicarboxylic acid such as maleic and fumaric acids. A polyester of this type is a semirigid resin having average physical properties of:

| | |
|---|---|
| Viscosity, Brookfield, cp. (77° F.) | 2300 |
| Specific Gravity | 1.30 |
| Acid Number of Liquid Resin | 13 |
| Color, Gardner | 3 |
| S.P.I. Gel-Time, minutes | 5.5 |
| Time to Peak Exotherm, minutes | 8.0 |
| Peak Exotherm Temperature, °F. | 390 |

The preparation of such a resin is described in Robitschek et al. U.S. Pat. No. 2,779,701 issued Jan. 29, 1957. The semirigid polyester resin is then mixed with the polymerizable monomeric compound (2) such as styrene and optionally a modifying monomer (B). A suitable resin containing the polymerizable monomeric compound (2) is available commercially under the trade name of "Hetron" 32 A. U.S. Pat. No. 2,779,701 describes and claims polyester resin compositions of the type set forth above. Examples 1, 4–11 and 18 illustrate the preferred polyester used in the present invention. Said patent defines the polyester in claim 1 as follows:

A polymerizable mixture comprising (A) a polymerizable linear polyester of ingredients comprising (1) a polyhydric alcohol, (2) an adduct of hexahalocyclopentadiene and a polycarboxylic compound containing aliphatic carbon to carbon unsaturation, wherein the halogen is selected from the group consisting of chlorine, bromine, fluorine and mixtures thereof, and (3) a polycarboxylic compound containing aliphatic carbon to carbon unsaturation, and (B) a polymerizable compound containing aliphatic carbon to carbon unsaturation.

The polyester resin may be used in the thermosetting patching composition alone or in combination with modifying reactive monomers containing aliphatic carbon to carbon unsaturation. The modifying monomers are over and above the unsaturated polymerizable component B of the polyester resin. Suitable monomers include vinyl acetate, vinyl toluene, styrene and $\alpha$-methyl styrene. The addition of the modifying monomer reduces viscosity, allowing 25–30 percent more fillers to be incorporated into the composition, while still retaining the desired working characteristics. The addition of vinyl acetate, vinyl toluene or $\alpha$-methyl styrene also reduces hardness, while still maintaining the good sanding properties of the patch. Styrene does not change hardness to any appreciable degree. The optimum quantity of modifying monomer that can be added is around 5 to 10 percent on the weight of the polyester resin. Monomer additions over 10 percent result in increased shrinkage of the patch and reduced adhesion and should not be used.

Inert fillers are used in conjunction with the formulation of the patching composition in order to improve working viscosity and to improve cost. In addition to the fillers, pigments may also be added to provide the desired color match to the wood substrate being patched. Fillers may include inorganic extender pigments such as clays, whiting or asbestos floats, or organic fillers such as shell flour or wood flour. Finely ground wood flour (90–95 percent through 325 mesh screen) has been found to be particularly suitable in giving an easily worked patch which will not shrink or bubble during cure. The inorganic fillers are less desirable, since they result in a hard, brittle patch and shrinkage during cure is more pronounced than with the wood flour.

The quantity of filler and pigment added will depend largely on the physical characteristics required of the patching composition for the particular application. In general it has been found desirable to employ from about 28 percent to about 45 percent of combined wood flour and pigment on the weight of polyester resin and reactive monomer present, in order to obtain a composition which can be easily worked with putty knife and/or be applied with a caulking gun. Less than 28 percent fillers will result in low viscosity material which is not readily handled, while with more than 45 percent filler, the composition becomes too thick for easy handling. A particularly suitable mixed filler-pigment is a mixture of $TiO_2$ and wood flour in the ratio of 1:3 to 1:6.

Catalysts which may be used to initiate cure of the polyester resin composition include peroxide and hydroperoxides such as methyl ethyl ketone peroxide, cyclohexanone peroxide or cumene hydroperoxide. Suitable activators such as cobalt napthenate, or dimethyl aniline may be used to provide room temperature curing, but are not generally desirable since working pot-life of the catalyzed mix becomes impractically short for most applications.

A 50:50 mixture of benzoyl peroxide in tricresyl phosphate, without promoter, has been found to be a very suitable catalyst for the patching composition of the invention. Used in an amount corresponding to 0.50 percent (0.25 percent benzoyl peroxide) on the weight of polyester resin, the catalyzed composition will have a working pot-life of around 3 days, and will cure at a temperature of 200°–212° F. (sufficiently low to prevent bubbling) in around 15 minutes. Larger or smaller amounts of catalyst may be used, depending on the cure rate and/or pot-life required for a given application.

The invention will now be illustrated by reference to the following nonlimitative examples:

EXAMPLE I 60 grams polyester resin (Hetron 32A)
5 grams $TiO_2$ pigment (Titanox RA-50)
and
18 grams—325 mesh Douglas fir wood flour were combined to give an intimate mixture.

3.0 grams of catalyst mixture (1.5 grams benzoyl peroxide in 1.5 grams tricresyl phosphate) were added and mixed in thoroughly just prior to use.

Working pot-life of the catalyzed composition was 3 days. Storage life of the uncatalyzed mixture was in excess of 3 months.

The catalyzed composition was a smooth paste which was easily worked with a putty knife or used in a caulking gun. It flowed easily into splits, small crevices, knot-holes and similar plywood defects.

When used for the patching of plywood, the patch cured in 15 minutes at 200° F. without bubbling, or shrinking when cooled. The resulting patch could be readily sanded. Softening point of the cured patch was 170° F. After 1,000 hours exposure in the Atlas Twin Arc Weatherometer using a 102-18 cycle (102 min. dry + 18 min. water spray—continuous arc), the patch showed excellent stability and adhesion to wood and exposed glue-line.

EXAMPLE II

The composition in example I was used to patch plywood, but curing was carried out for 10 minutes at 235° F. A slightly harder surface was obtained, but with the higher cure temperature there was a slight tendency for the patch to bubble.

EXAMPLE III 60 grams polyester resin (Hetron 32A)
3.0 grams catalyst mixture containing 1.5 gms. benzoyl peroxide and 1.5 gms. tricresyl phosphate
5 grams $TiO_2$ pigment (Titanox RA-50)
1.4 grams Ferrite yellow pigment
0.05 grams Burnt Sienna
12 grams Douglas fir wood flour (−200 mesh)

were combined in a paste mixer to give a smooth flowing paste.

Used as a patching compound for Douglas fir plywood, the color blended well with the natural color of the wood. The reduced viscosity cf. example I provided easier flow into narrow splits and crevices and required lower pressure to be used in a fine-tipped caulking gun.

The patches were cured at 235° F. for 10 minutes with slight bubbling. Performance of the patch was similar to that of example I and II, i.e.
softening point 170° F.
no shrinkage on cooling
good stability in Weatherometer tests.

EXAMPLE IV

To illustrate the effect of adding various polymerizable monomers to the patching composition.
To a base mix consisting of:
60 grams polyester resin (Hetron 32A)
5 grams $TiO_2$ pigment (Titanox RA-50)
3.0 grams catalyst mixture of ex. 1
were added to the quantities of monomer and wood flour shown in the following table:

| Monomer type | None | Styrene | | | α-Methyl styrene | | Vinyl toluene | | | | Vinyl acetate | | |
| --- | --- | --- | --- | --- | --- | --- | --- | --- | --- | --- | --- | --- | --- |
| Amount (grams) | | 5 | 5 | 15 | 5 | 5 | 5 | 6 | 7.5 | 10 | 5 | 6 | 9 |
| Wood flour (grams) | 19 | 16 | 18 | 21 | 25 | 18 | 21 | 16 | 22 | 23 | 25 | 14 | 21 | 26 |
| Total filler (grams) | 24 | 21 | 23 | 26 | 30 | 23 | 26 | 21 | 27 | 28 | 30 | 19 | 26 | 31 |
| Percent on polyester | 40 | 35 | 38.2 | 43.4 | 50 | 38.2 | 43.4 | 35 | 45 | 46.6 | 50 | 31.7 | 43.4 | 51.6 |
| Percent on polyester plus monomer | 40 | 35 | 35.4 | 40 | 40 | 35.4 | 40 | 32.3 | 41.0 | 41.5 | 42.9 | 29.2 | 40 | 45 |
| Cure: | | | | | | | | | | | | | | |
| Time (min.) | 15 | 12 | 15 | 20 | 20 | 60 | 60 | 25 | 15 | 15 | 15 | 15 | 30 | 15 |
| Temp. (° F.) | 200 | 225 | 235 | 200 | 200 | 200 | 200 | 200 | 212 | 212 | 212 | 235 | 200 | 212 |
| Softening point (° F.) | 170 | | 170 | 160 | | 120 | 120 | 140 | | | 100 | 130 | 170 | 100 |
| Adhesion [1] | G | G | F | F | P | F | F | G | F | P | P | F | P | P |
| Swelling [1] | N | SL | SL | N | N | SL | SL | SL | N | N | SL | SL | N | SL |
| Shrinkage [1] | N | N | N | N | Y | N | N | N | N | N | SL | N | N | SL |
| Sanding [1] | G | G | G | G | G | G | G | G | G | G | G | G | G | G |
| Flexibility/resilience [1] | F | F | P | P | P | G | G | G | G | G | G | G | G | G |

[1] G=Good; F=Fair; P=Poor; N=None; SL=Slight; Y=Yes.

What we claim as our invention is:

1. A method for patching plywood comprising the steps of preparing a blend of (A) 45 to 72 weight percent of a mixture containing (1) a polymerizable linear polyester resin comprising reactants of (a) a polyhydric alcohol, (b) an adduct of hexahalocyclopentadiene and an ethylenically unsaturated dicarboxylic acid or anhydride and (c) a compound selected from the group consisting of maleic anhydride and fumaric acid and (2) an ethylenically unsaturated monomer, (B) 0–10 weight percent of a modifying monomer selected from the group consisting of styrene, vinyl toluene, vinylacetate and α-methyl styrene, said modifying monomer being in addition to said ethylenically unsaturated monomer, and (C) 28 to 45 weight percent of an inert material selected from the group consisting of clay, whiting, asbestos, shell flour and wood flour, mixing a catalyst with said blend, applying the catalyzed blend to defects in a plywood surface and curing the blend for at least 10 minutes at a temperature of about 200° to 235° F

2. The method of claim 1 wherein (a) is selected from the group consisting of ethylene glycol, propylene glycol, diethylene glycol, triethylene glycol and mixtures thereof, said ethylenically unsaturated dicarboxylic acid anhydride of (b) is maleic anhydride, (c) is maleic anhydride and (2) is styrene 3. The method of claim 2 wherein said catalyst is a mixture of benzoyl peroxide in tricresyl phosphate 4. The method of claim 2 wherein (B) is present in an amount of 5 to 10 weight percent based on said polymerizable linear polyester resin